(12) United States Patent
Yamasuge

(10) Patent No.: US 7,724,804 B2
(45) Date of Patent: May 25, 2010

(54) RECEIVING APPARATUS AND CHANNEL ESTIMATING APPARATUS

(75) Inventor: Hiroyuki Yamasuge, Tokyo (JP)

(73) Assignee: Sony Corporation, Tokyo (JP)

( * ) Notice: Subject to any disclaimer, the term of this patent is extended or adjusted under 35 U.S.C. 154(b) by 817 days.

(21) Appl. No.: 11/599,454

(22) Filed: Nov. 15, 2006

(65) Prior Publication Data

US 2007/0147479 A1 Jun. 28, 2007

(30) Foreign Application Priority Data

Nov. 15, 2005 (JP) ............................. 2005-330809

(51) Int. Cl.
*H04B 1/00* (2006.01)
(52) U.S. Cl. ..................................................... 375/136
(58) Field of Classification Search .................. 375/136
See application file for complete search history.

(56) References Cited

U.S. PATENT DOCUMENTS

| | | | | |
|---|---|---|---|---|
| 6,912,258 | B2 * | 6/2005 | Birru | 375/340 |
| 6,928,120 | B1 * | 8/2005 | Zhang | 375/260 |
| 7,027,530 | B2 * | 4/2006 | McFarland et al. | 375/341 |
| 7,058,002 | B1 * | 6/2006 | Kumagai et al. | 370/203 |
| 7,161,896 | B1 * | 1/2007 | Hart et al. | 370/206 |
| 7,170,884 | B1 * | 1/2007 | Radimirsch et al. | 370/350 |
| 7,340,000 | B1 * | 3/2008 | Hart et al. | 375/260 |
| 7,397,758 | B1 * | 7/2008 | Hart et al. | 370/208 |
| 7,440,506 | B2 * | 10/2008 | Atungsiri et al. | 375/260 |
| 2004/0131022 | A1 * | 7/2004 | Ito | 370/320 |
| 2006/0018393 | A1 * | 1/2006 | Gore et al. | 375/260 |
| 2006/0072524 | A1 * | 4/2006 | Perahia et al. | 370/338 |
| 2006/0120267 | A1 * | 6/2006 | De Bart et al. | 370/208 |

OTHER PUBLICATIONS

Cabric, "On MIMO signal processing for adaptive W-CDMA and transceivers", Conference on Wireless Communications and Applied Computational Electromagnetics, 2005, Apr. 3-7, 2005 pp. 58-61.*

* cited by examiner

*Primary Examiner*—Juan A Torres
(74) *Attorney, Agent, or Firm*—Finnegan, Henderson, Farabow, Garrett and Dunner, L.L.P.

(57) ABSTRACT

A receiving apparatus receives an Orthogonal Frequency Division Multiplexing (OFDM) signal, including an OFDM symbol, subject to frequency hopping on multiple bands, the OFDM symbol, which functions as a channel estimation sequence, being transmitted multiple times at hopping intervals in a time division manner on each of the bands. The apparatus includes a receiving section for receiving the OFDM signal transmitted on a channel, a Fourier transform section for demultiplexing the OFDM signal into signals of sub-carriers, a channel correcting section for estimating a channel characteristic by using the OFDM symbol functioning as a channel estimation sequence resulting from the demultiplexing into sub-carrier signals and performing channel correction thereon, and a decoding section for performing symbol identification and decoding on the channel-corrected data signal back to the original data signal.

5 Claims, 6 Drawing Sheets

PRIOR ART

PRIOR ART

RECEIVING APPARATUS AND CHANNEL ESTIMATING APPARATUS

CROSS REFERENCES TO RELATED APPLICATIONS

The present invention contains subject matter related to Japanese Patent Application JP2005-330809 filed in the Japanese Patent Office on Nov. 15, 2005, the entire contents of which being incorporated herein by reference.

BACKGROUND OF THE INVENTION

1. Field of the Invention

The present invention relates to a receiving apparatus and channel estimating apparatus that receive send signals subject to frequency hopping and perform channel estimation and, in particular, to a receiving apparatus and channel estimating apparatus that average multiple channel estimation results in a time domain and remove an influence of noise.

2. Description of the Related Art

A wireless network has received attentions as a system for freeing from wiring in a wired communication method in the past. The standard specifications relating to a wireless network may include IEEE (The Institute of Electrical and Electronics Engineers) 802.11.

OFDM (Orthogonal Frequency Division Multiplexing) transmission scheme has been expected as a technology that avoids the deterioration of transmission quality due to the fading of wireless signals and increases the speed and/or quality of the wireless transmission. IEEE 802.11a/g, for example, has adopted OFDM modulation scheme as standard specifications for a wireless Local Area Network (LAN). Though a wireless communication scheme called "Ultra Wide Band (UWB) Communication" employing a significantly wide frequency band has received attentions in recent years, the standardization conference in IEEE 802.15.3 has reviewed DSSS (Direct Sequence Spread Spectrum)-UWB scheme and OFDM_UWB adopting OFDM modulation scheme.

In OFDM transmission scheme, frequencies for carriers are defined such that the sub-carriers can be orthogonal to each other within a symbol period. The expression, "the sub-carriers can be orthogonal to each other", refers to that the peak point of the spectrum of an arbitrary sub-carrier can typically agree with the zero point of the spectrums of other sub-carriers. In OFDM modulation scheme, since send data is divided into and is transmitted in multiple carriers at different frequencies, the band of each of the carriers is narrowed, which may significantly increase the efficiency of frequency application and the resistance to the interference of frequency-selective fading.

A small place such as an office has a problem of the coexistence of multiple wireless networks in a communication environment. Accordingly, frequency hopping (FH) scheme is adopted for flexibly changing the frequency band to use. In this communication scheme, packets are exchanged by changing the frequency randomly every time, and the influence from another system may disturb the communication. However, the continuous change of the frequency may hardly interrupt the communication. In other words, the coexistence with other systems is allowed with good resistance to fading and easy scalability.

For example, a multi-band scheme of OFDM_UWB scheme as described above has been reviewed in which each of the bands from 3.1 GHz to 10.6 GHz defined by the Federal Communications Commission (FCC) is divided into multiple sub-bands each having 528 MHz, and frequency hopping (FH) is performed among the sub-bands.

FIG. 7 shows an example of the frequency assignment defined by the multi-band OFDM_UWB communication scheme (which will be called "MB-OFDM" hereinafter) (refer to "MBOFDM PHY Specification Final Release 1.0," Wimedia alliance, Apr. 27, 2005 (Non-Patent Document 1), for example). In the shown example, the band of 5 GHz to be used by a wireless LAN is a Null band, and the other band is divided into thirteen sub-bands. The sub-bands are divided into four groups of A to D, and communication is performed by managing the frequency of each of the groups.

FIG. 8 shows a state in which data transmission is performed in the multi-band OFDM scheme by performing frequency hopping on an OFDM symbol in a time domain. In the shown example, Group A having Bands #1 to #3 is used, and frequency hopping is performed by changing the center frequency for each one OFDM symbol, and OFDM modulation is performed by using inverse fast Fourier transform/fast Fourier transform (IFET/FET) having 128 points.

By the way, wireless communication has a problem that a signal transmitted from a transmitting apparatus is subject to the influence of a channel characteristic on the transmission path before being received by a receiving apparatus. More specifically, since a send signal has the phase rotated and the signal amplitude changed on the transmission path, the original data may not be properly decoded from the received signal. Thus, the receiving apparatus may need to estimate the channel characteristic and perform channel correction for correcting the amount of phase rotation and the amplitude of the received signal.

The channel estimation is generally achieved by exchanging a known sequence between a transmitting apparatus and a receiving apparatus. In other words, a transmitting apparatus transmits a training sequence for channel estimation (called "channel estimation sequence" hereinafter) including a preamble of the packet, and the receiving apparatus multiples the received preamble by the known sequence. Thus, the amount of phase rotation and the amount of amplitude change on the transmission path are obtained, and the channel correction can be performed that on the payload by performing an operation of reversing the phase by the amount of phase rotation and putting the amplitude back.

In OFDM transmission scheme, one channel estimation sequence includes one OFDM symbol, for example. Partial sub-carriers of a channel estimation sequence may be lost due to the influence of fading, and proper channel estimation may not be performed as a result. Therefore, moving averaging processing is generally performed on the adjacent multiple sub-carriers in a frequency domain of the sub-carriers included in the OFDM symbol for channel estimation, whereby the influence of fading is removed. Furthermore, in order to avoid the decrease in accuracy of the channel estimation due to thermal noise, which is added during radio frequency (RF) analog processing, a transmitting apparatus transmits a channel estimation sequence multiple times while a receiving apparatus averages the multiple channel estimation values in a time domain. Thus, the influence of thermal noise can be reduced, and the accuracy of the channel estimation can be improved (refer to JP-A-2000-358010, Paragraph No. 0013 (Patent Document 1), for example).

FIG. 9 schematically shows mechanisms for channel estimation and channel correction in OFDM transmission scheme. In this case, the preambles before a payload of a transmission packet from a transmitting apparatus include a synchronization sequence and a channel estimation sequence as shown in FIG. 10. The channel estimation sequence includes two known sequences each having one OFDM symbol.

The receiving apparatus performs RF processing on the received signals transmitted as time-axis signals, performs FFT (that is, OFDM demodulation) thereon and demultiplexes them into sub-carriers aligned in the frequency domain (not shown). Then, the channel estimation part of the packet is extracted and is multiplied by a known channel estimation sequence that the receiving apparatus holds, whereby the correlation value is obtained.

Some sub-carriers aligned in the frequency domain may be lost due to fading caused during transmission. The influence of fading is removed by averaging each sub-carrier included in the channel estimation sequence and adjacent multiple sub-carriers in the frequency domain. Furthermore, the accuracy of channel estimation is improved by averaging, in the time domain, the channel estimation values having multiple OFDM symbols for channel estimation. Then, the channel estimation result therefrom is multiplied by the payload part of the packet, whereby the operation for correcting the amplitude change and phase rotation due to a channel characteristic is performed.

The averaging, in the time domain, of the channel estimation results among multiple OFDM symbols can provide a channel estimation result with higher accuracy excluding the influence of thermal noise, which is added when RF analog processing is performed thereon.

However, a system applying frequency hopping has a problem that the averaging in the time domain causes a frequency error in channel estimation values of bands. Generally, a channel estimation sequence of each frequency channel is transmitted in a time division manner in accordance with a hopping pattern (that is, for each cycle for performing frequency hopping). For example, in a communication system that performs frequency hopping on three bands of Bands A, B and C, when a channel estimation sequence is transmitted in a time division manner by using two OFDM symbols for each band, such as A1 and A2, B1 and B2 and C1 and C2 as shown in FIG. 11, the interval between A1 and A2 increases by the time equivalent to the hopping interval. The phase of the received OFDM signal drifts on each of the bands during the time interval, which causes a large frequency error and an error in channel estimation values in averaging in the time domain. As a result, the bit error rate is deteriorated, which is a problem.

SUMMARY OF THE INVENTION

Accordingly, it is desirable to propose an excellent receiving apparatus and channel estimating apparatus, which can receive a send signal subject to frequency hopping and preferably perform channel estimation thereon.

It is further desirable to propose an excellent receiving apparatus and channel estimating apparatus, which can average channel estimation results from multiple OFDM symbols on a time domain for each band subject to frequency hopping and preferably remove the influence of noise.

It is further desirable to propose an excellent receiving apparatus and channel estimating apparatus, which can remove a factor responsible for a frequency error in averaging in a time domain and perform channel estimation with higher precision even when the time interval increases between OFDM symbols for channel estimation, which are transmitted for each frequency channel.

According to an embodiment of the present invention, there is provided a receiving apparatus that receives an OFDM signal subject to frequency hopping on multiple bands, the OFDM symbol, which functions as a channel estimation sequence, being transmitted multiple times at hopping intervals in a time division manner on each of the bands, the apparatus including receiving means for receiving the OFDM signal transmitted on a channel, Fourier transform means for demultiplexing the OFDM signal into signals of sub-carriers, channel correcting means for estimating a channel characteristic by using the OFDM symbol functioning as a channel estimation sequence resulting from the demultiplexing into sub-carrier signals and performing channel correction thereon, and decoding means for performing symbol identification and decoding on the channel-corrected data signal back to the original data signal, wherein the channel correcting means obtains, for each of the bands, a frequency error between the OFDM symbols for channel estimation, which are transmitted at hopping intervals, adds and averages the frequency errors obtained for the bands and normalizes the result by the center frequencies of the bands, multiplies, on each of the bands, the normalized frequency error by each of the sub-carriers of the OFDM symbol back to the angle of phase rotation of each of the sub-carriers, integer-multiplies the phase rotation information of each of the sub-carriers by the symbol difference between OFDM symbols transmitted at hopping intervals, corrects the amount of phase rotation with respect to the channel estimation values of the OFDM symbols based on the integer-multiplied phase rotation information, which results in the agreement of the phases of the channel estimation values from the OFDM symbols on one band, and averages, thereafter, the channel estimation values of the OFDM symbols on the bands in a time domain.

The embodiment of the invention relates to a receiving apparatus that performs processing of receiving an OFDM signal. In OFDM modulation scheme, since send data is divided into and is transmitted in multiple carriers at different frequencies, the band of each of the carriers is narrowed, which may significantly increase the efficiency of frequency application and the resistance to the interference of frequency-selective fading. More specifically, the embodiment of the invention relates to an OFDM receiving apparatus applying frequency hopping scheme. When packets are exchanged by changing frequencies randomly every time, the influence from another system may disturb the communication. However, the continuous change of the frequency may hardly interrupt the communication. The coexistence with other systems is allowed with good resistance to fading and easy scalability.

On the other hand, since, on a transmission path, the influence of a channel characteristic rotates the phase of a send signal and changes the signal amplification, a receiving apparatus side may be necessary to perform channel correction including estimating the channel characteristic and correcting the amount of phase rotation and amplitude of the received signal.

The channel estimation is performed by multiplying a channel estimation sequence generally included as a preamble of a packet by a known sequence and obtaining the amount of phase rotation and amount of amplitude change on a transmission path from the correlation value. Moving averaging processing is performed on adjacent multiple sub-carriers in the frequency domain, whereby the influence of fading is removed. Furthermore, the channel estimation values obtained from multiple channel estimation sequences are averaged in a time domain, whereby the decrease in accuracy of channel estimation due to noise may be suppressed.

However, when an OFDM symbol for channel estimation is transmitted multiple times in a system applying frequency hopping, the intervals at which OFDM symbols are received increase by the time equivalent to the hopping interval on each of bands. Thus, the phase of the received OFDM signal drifts, which causes a large frequency error and an error in multiple channel estimation values in averaging in the time domain. As a result, the bit error rate is deteriorated, which is a problem.

Accordingly, in a receiving apparatus according to an embodiment of the invention, the frequency errors obtained among OFDM symbols of bands are added, and phase rotation information of all of the bands are averaged, whereby the frequency error can be detected with high precision.

Furthermore, the phase rotation information averaged among all bands is normalized by the center frequency of each of the bands, and the resulting frequency error is multiplied by each sub-carrier of the OFDM symbol back to the phase rotation angle of each sub-carrier.

The phase rotation information of each of the sub-carriers is integer-multiplied by the symbol difference between OFDM symbols transmitted at hopping intervals, and the amount of phase rotation with respect to the channel estimation values of the OFDM symbols is corrected based on the integer-multiplied phase rotation information, which results in the agreement of the phases of the channel estimation values.

In this way, the channel estimation with high precision may be achieved by averaging the channel estimation values excluding the frequency errors in a time domain.

For example, in a communication system that performs frequency hopping on three bands of Bands A, B and C, when channel estimation sequences are transmitted in a time division manner by using two OFDM symbols for each band, such as A1 and A2, B1 and B2 and C1 and C2, the interval between A1 and A2 increases by the time equivalent to the hopping interval (see FIG. 11).

In a receiving apparatus according to an embodiment of the invention, a frequency error in Band A is obtained from A1 and A2 before averaging in a time domain by a channel correcting unit. This is also performed on Bands B and C, and the results of all bands are added, whereby the phase rotation information is averaged. Then, the phase rotation information averaged among all bands is normalized by the center frequencies of the bands. The averaging by using the frequency errors on all of bands may increase the number of samples for error calculation and perform frequency error detection with high precision.

The resulting frequency error is multiplied by the frequencies of the sub-carriers back to the phase rotation angles. The phase rotation angle is integer-multiplied by the symbol difference between A1 and A2, which eliminates the frequency errors of A1 and A2 and results in the agreement of the phase of the channel estimation values obtained from A1 and A2. Then, the time average can be obtained therefrom. The same is true for the other bands B and C, and the time average of the channel estimation values on the bands can be obtained after the phase of the channel estimation values obtained from B1 and B2 and C1 and C2 are brought into the agreement.

In a receiving apparatus according to an embodiment of the invention, the use of the frequency error detected with high precision as described above as the initial value of a loop filter for frequency tracking can improve the tracking characteristic of a frequency tracking circuit and can suppress the deterioration of the receiving characteristic.

According to embodiments of the invention, an excellent receiving apparatus and channel estimating apparatus can be provided which can average multiple channel estimation results in a time domain and preferably remove the influence of noise.

According to the embodiments of the invention, an excellent receiving apparatus and channel estimating apparatus can be provided which can remove a factor responsible for a frequency error in averaging in a time domain and perform channel estimation with higher precision even when the time interval increases between OFDM symbols for channel estimation, which are transmitted for each frequency channel.

According to embodiments of the invention, in receiving and performing channel estimation on OFDM symbols adopting frequency hopping scheme, frequency error correction with high precision is performed on multiple channel estimation values on one band to be averaged before averaging them in a time domain. Thus, a frequency error is removed from the channel estimation value between two OFDM symbols in averaging in a time domain, which allows channel estimation and channel correction with high precision.

The other objects, features and advantages of the invention will be more apparent from more detail descriptions based on embodiments of the invention, which will be described later, and attached drawings.

DESCRIPTION OF THE PREFERRED EMBODIMENTS

With reference to drawings, embodiments of the invention will be described in more detail below.

Figure 1:
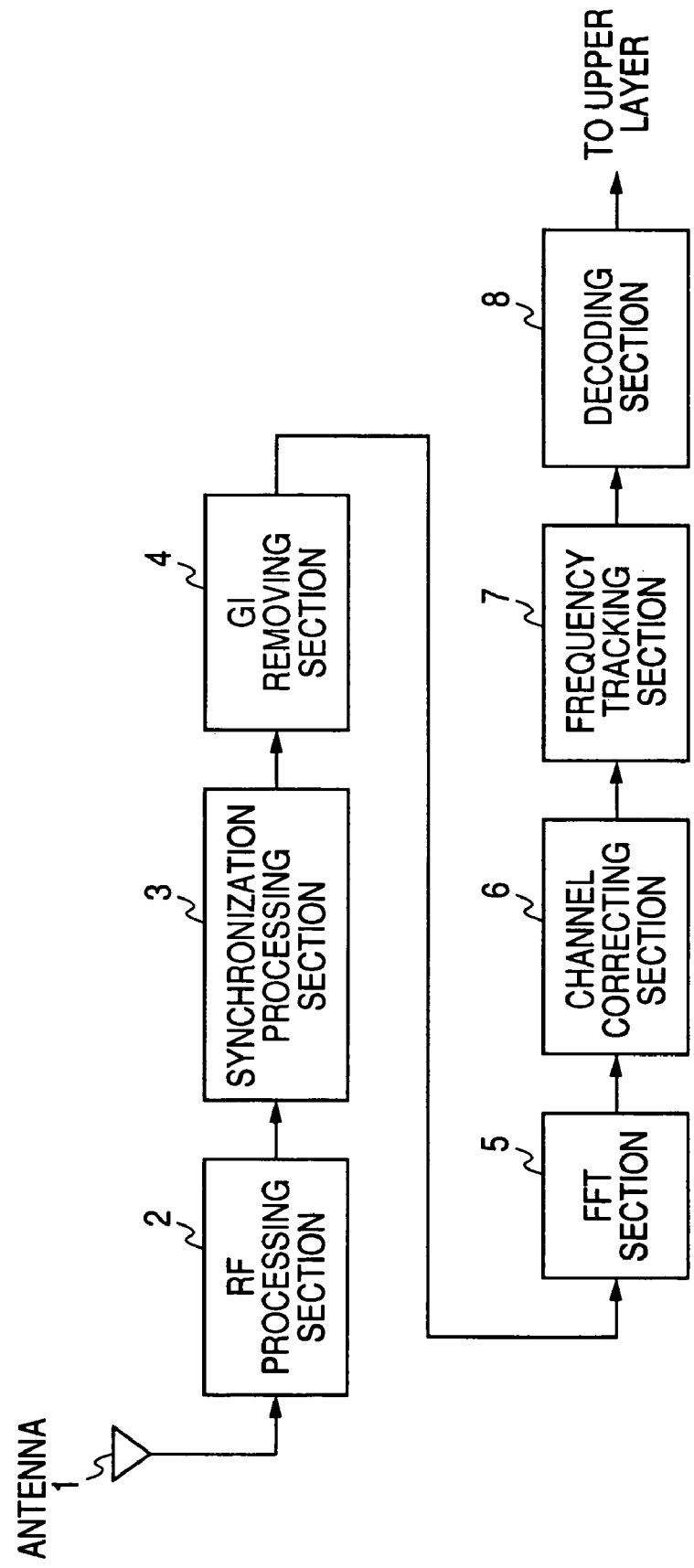
FIG. 1 is a diagram schematically showing a construction of an OFDM receiving apparatus according to an embodiment of the invention.
Figure 11:
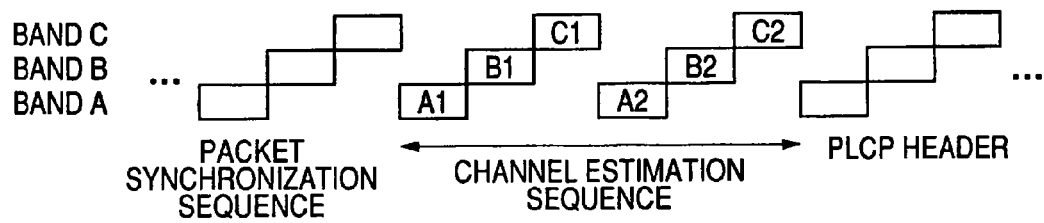
FIG. 11 is a diagram showing a state that a channel estimation sequence for each frequency channel is transmitted in a time-division manner.

FIG. 1 schematically shows a construction of an OFDM receiving apparatus according to an embodiment of the invention. The receiving apparatus is compliant with a communication scheme which performs frequency hopping among three bands A to C. A transmitting apparatus side transmits a packet including a synchronization preamble and a channel estimation preamble by switching the band to be used for each OFDM symbol in a predetermined hopping pattern. Thus, the channel estimation sequence has two OFDM symbols such as A1 and A2, B1 and B2 and C1 and C2 for each band as shown in FIG. 11, and the interval between A1 and A2 increases by the time equivalent to the hopping interval.

An RF processing section 2 performs filtering for extracting a desired band, amplification of low noise power, down-conversion by frequency conversion, removal of an unnecessary side band caused during the frequency conversion and A-D conversion on an OFDM signal received by the antenna 1 and outputs the result as a baseband signal.

A synchronization processing section 3 detects a frequency error and a symbol timing by using a synchronization preamble signal included in the baseband signal and corrects the frequency error.

A guard interval (GI) removing section 4 performs FFT window processing for a time width excluding a signal corresponding to the guard interval from one OFDM symbol length of each one OFDM symbol on the base band signal based on the detected symbol timing.

An FFT section 5 performs fast Fourier transform on the input baseband signal for each one OFDM symbol and demultiplexes the result into signals for sub-carriers.

A channel correcting section 6 estimates the transmission path of an OFDM signal, that is, the characteristic of a channel by using the signal corresponding to the channel estimation sequence among the input sub-carrier signals. Then, the channel estimation result indicates the amount of phase rotation and change in amplification of each of the sub-carriers, and the channel correcting section 6 corrects the phase and amplification of each of the sub-carrier signals, which correspond to the payload part of a packet.

A multi-carrier transmission scheme such as OFDM has a problem in which the timing drifts in a period that a data symbols are continuously transmitted for a long time. The timing drift twists the phase of a sub-carrier. Accordingly, a frequency tracking section 7 performs phase tracking on a residual frequency estimation error of a received signal by using pilot sub-carriers inserted to a data part at predetermined intervals.

A decoding section 8 performs symbol identification on a data signal after channel correction and decodes the result to a data signal. Then, the decoded data undergoes data processing by an upper layer (application).

An FFT section 5 demultiplexes the signal corresponding to the received channel estimation sequence into sub-carriers, and the channel correcting section 6 multiplies the result by a known channel estimation sequence that the channel correcting section 6 holds, whereby the channel characteristics that the OFDM signal have undergone, that is, the amount of phase rotation and change in amplification can be calculated.

According to this embodiment, since frequency hopping scheme is applied, the channel correcting section 6 may need to perform channel estimation and channel correction on each band to be used.

Here, in the communication system that performs frequency hopping among three bands A to C, the interval between A1 and A2 increases by the time corresponding to the hopping interval when the channel estimation sequence is transmitted in a time division manner by using two OFDM symbols for each band, such as A1 and A2, B1 and B2 and C1 and C2 as shown in FIG. 11. During the time period, the phase of an OFDM signal to receive drifts on each band, which causes a large frequency error and further causes an error in channel estimation value for averaging in a time domain. As a result, the bit error rate may be deteriorated, which is a problem.

Accordingly, the channel estimation in the channel correcting section 6 in the receiving apparatus according to this embodiment includes adding the frequency errors caused among OFDM symbols for each band and averaging the phase rotation information, which can achieve the detection of a frequency error with high precision.

Furthermore, the averaged phase rotation information is normalized by the center frequencies of the bands, and the obtained frequency errors are multiplied by the sub-carriers of the OFDM symbols back to the phase rotation angle of each of the sub-carriers.

Then, the phase rotation information of each sub-carrier is integer-multiplied by the symbol difference between OFDM symbols transmitted at hopping intervals, and the amount of phase rotation is corrected for the channel estimation value of each OFDM symbol based on the integer-multiplied phase rotation information, which results in the agreement of the phases of channel estimation values.

The averaging of channel estimation values excluding frequency errors in a time domain allows the channel estimation with high precision.

For example, in the communication system that performs frequency hopping among three Bands A to C, the interval between A1 and A2 increases by the time corresponding to the hopping interval when the channel estimation sequence is transmitted in a time division manner by using two OFDM symbols for each band, such as A1 and A2, B1 and B2 and C1 and C2 (see FIG. 11).

In the receiving apparatus according to an embodiment of the invention, the frequency error of Band A is obtained from A1 and A2 before averaging by the channel correcting unit in a time domain. This is also performed on Bands B and C, and the results are added, whereby the phase rotation information is averaged. After the phase rotation information is averaged, the result is normalized by the center frequencies of the bands. The averaging by using the frequency errors of all of the bands allows the detection of frequency errors with high precision.

The obtained frequency errors are multiplied by the frequencies of the sub-carriers back to the phase rotation angle. Then, the result is integer-multiplied by the symbol difference between A1 and A2, which eliminates the frequency errors of A1 and A2 and results in the agreement of the phases of the channel estimation values obtained from A1 and A2. Then, time average is performed thereon. The same is performed on the other bands B and C. The time averages of the channel estimation values for bands are calculated after the agreement of the phases of the channel estimation values obtained from B1 and B2 and C1 and C2.

Figure 2:
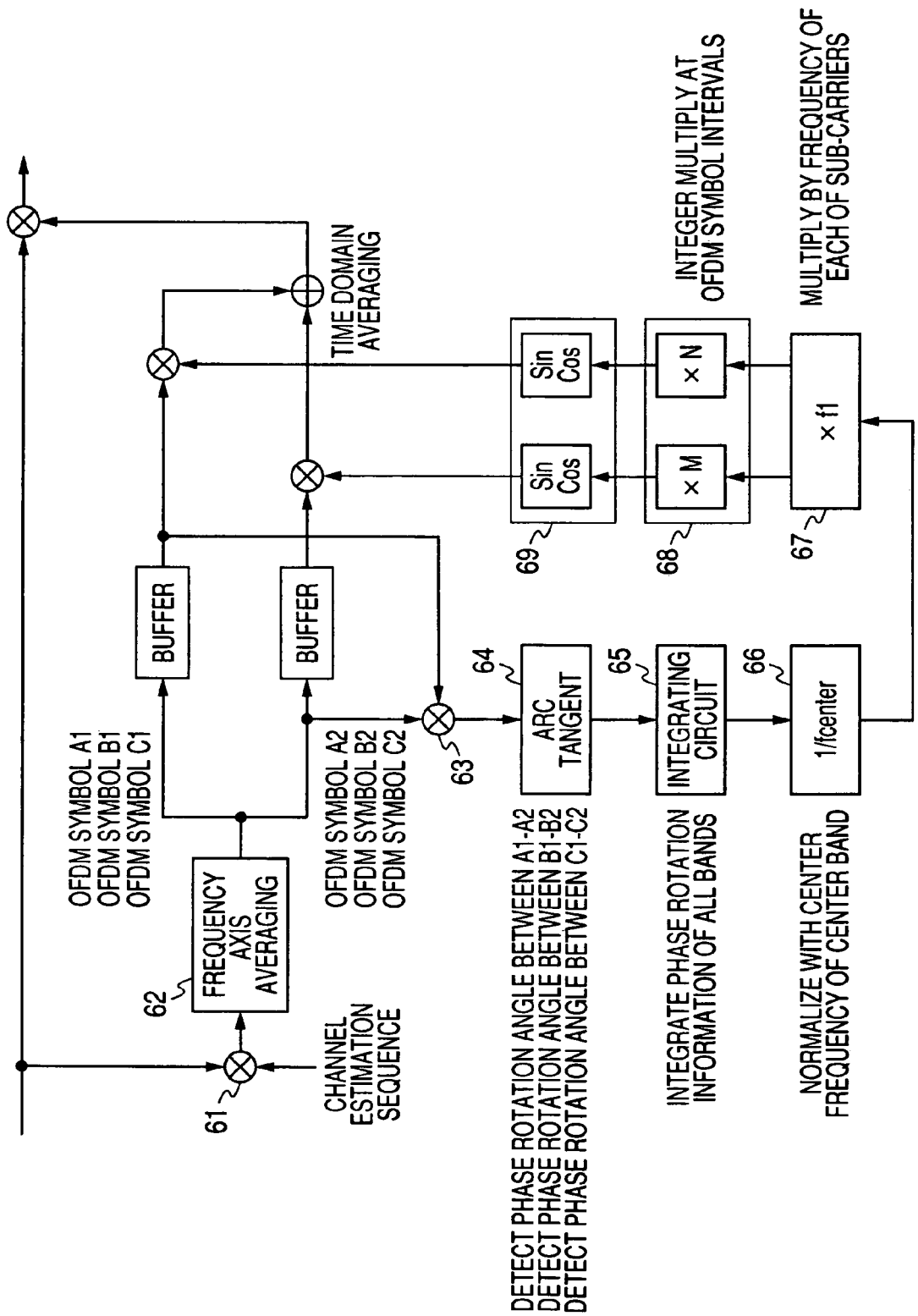
FIG. 2 is a diagram showing an internal construction of a channel correcting section 6.

FIG. 2 shows an internal construction of the channel correcting section 6 according to this embodiment. The channel correcting section 6 receives the input of signals resulting from the RF processing, FFT (that is, OFDM demodulation) and demultiplexing on received signals, which are transmitted as time domain signals through the bands A to C, into multiple sub-carriers on a frequency domain.

First of all, a multiplying section 61 extracts, on bands A to C, a part corresponding to the channel estimation part of a packet and multiplies it by a known channel estimation sequence that the multiplying section 61 holds. Then, moving averaging processing is performed by averaging section 62 on adjacent multiple sub-carriers in a frequency domain of the sub-carriers included in OFDM symbols for channel estimation, which removes the influence of fading. However, the averaging processing in a frequency domain does not directly relate to the substance of the invention and will not be described further herein.

Next, a multiplying section 63 multiplies the channel estimation values of OFDM symbols transmitted at hopping intervals on bands A to C and thus calculates the frequency error caused by the times of the hopping intervals between A1 and A2, B1 and B2 and C1 and C2. A subsequent phase rotation angle obtaining section 64 obtains the frequency error as phase rotation information by obtaining Arctangent of each of the multiplied values.

An integrating section 65 averages phase rotation information by adding the phase rotation angles obtained between A1 and A2, B1 and B2 and C1 and C2 of bands A to C. The averaging of the frequency errors of all of the bands A to C allows the detection of the frequency errors with high precision.

A phase rotation information normalizing section 66 averages the phase rotation information of the bands and normalizes the results by the center frequencies $f_{center\_A}$, $f_{center\_B}$ and $f_{center\_C}$ of the bands.

Next, a phase rotation angle calculating section 67 multiplies the phase rotation information of the frequency errors normalized by the center frequencies of the bands by the frequencies of the sub-carriers of the OFDM symbols A1, A2 and so on, whereby the frequency errors are returned to the phase rotation angles.

As shown in FIG. 11, the interval between A1 and A2 is equal to the time corresponding to a hopping interval, and A1 and A2 has a frequency error corresponding to the time interval. A1 and A2 are integer-multiplied by the symbol difference by an integer-multiplying section 68, and the obtained phase rotation angle is converted in conversion section 69 to sin and cos information, which is then multiplied by the channel estimation values of the OFDM symbols A1 and A2. Thus, the frequency error in accordance with the symbol interval is eliminated, which results in the agreement of the phase differences. In this example, M=0 and N=3. The same is true for the other bands B and C, and the time average of the channel estimation values of the bands are obtained after the agreement of the phase differences. In this way, since the time average of the channel estimation values of the OFDM symbols A1 and A2 is obtained after the elimination of phase differences, more accurate channel estimation values can be obtained, which can achieve the channel correction with high precision.

The same is true for the other bands B and C, and the time average of the channel estimation values of the bands is obtained after the agreement of the phases of the channel estimation values obtained from B1 and B2 and C1 and C2.

Figure 3:
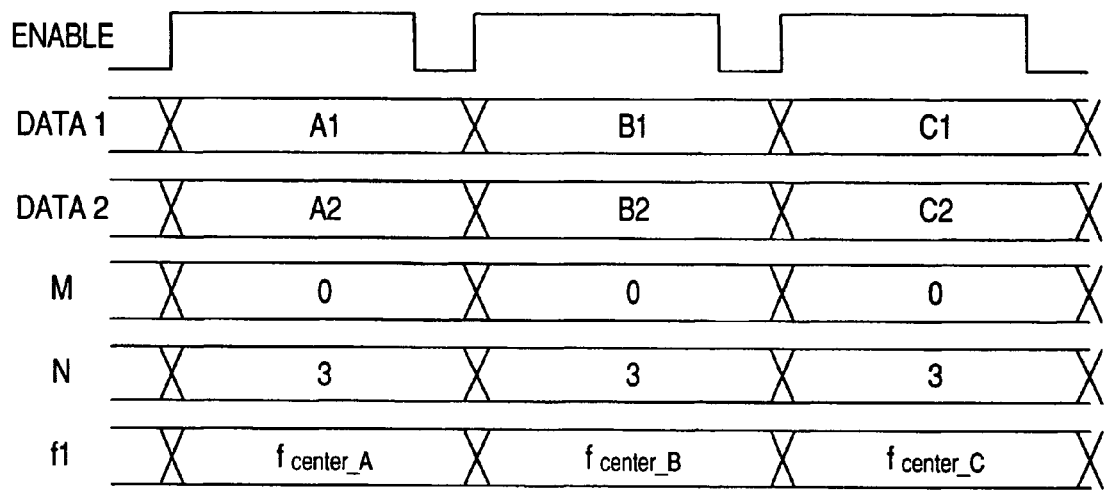
FIG. 3 is an operational timing chart in averaging, in a time domain, channel estimation values of OFDM signals subject to frequency hopping in the pattern shown in FIG. 11 in the channel correcting section 6 shown in FIG. 2.

FIG. 3 shows an operational timing chart for obtaining the average in a time domain of channel estimation values of OFDM signals subject to frequency hopping in a pattern shown in FIG. 11 within the channel correcting section 6 shown in FIG. 2.

Figure 4:
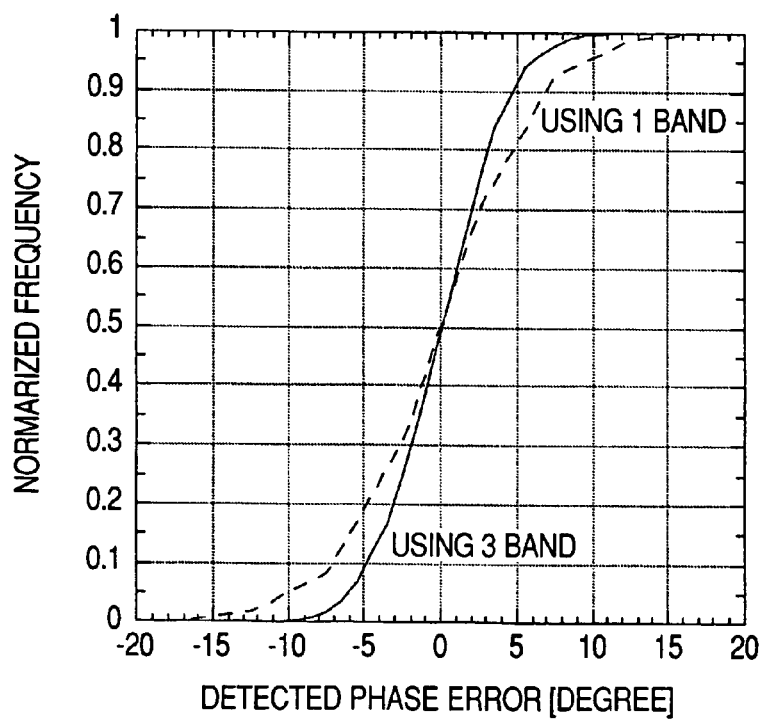
FIG. 4 is a diagram showing the result of the comparison between the characteristic resulting from the phase correction on bands by using a frequency error obtained by averaging phase rotation information of three bands and the characteristic resulting from the phase correction on bands by using phase rotation information obtained from each one band.

FIG. 4 shows a result from the comparison between the characteristic resulting from the phase correction of the bands by frequency errors obtained by averaging the phase rotation information of three bands collectively and the characteristic resulting from the phase correction of the bands by using the phase rotation information obtained from each band. In this case, $E_s/N_0$=0 dB, the channel group is A, and the frequency error is 40 ppm, for example, in multi-band OFDM scheme.

With 40 ppm, the phase of one OFDM symbol rotates by about 20 degrees. In other words, when the rotation by 20 degrees can be estimated, the detected phase error can be zero. FIG. 4 shows a CDF (cumulative distribution function) resulting from the implementation of this 1000 times by changing the noise seed, for example. While an estimated error of 15 degrees may occur with one band used, the estimated error can be suppressed to 10 degrees at worst with three bands used.

The frequency error detected with high precision by averaging the frequency errors of all of the bands A to C may be used as the initial value of a loop filter for frequency tracking. In this case, the tracking characteristic of a frequency tracking circuit is improved, and the deterioration of the receiving characteristic can be decreased.

Figure 5:
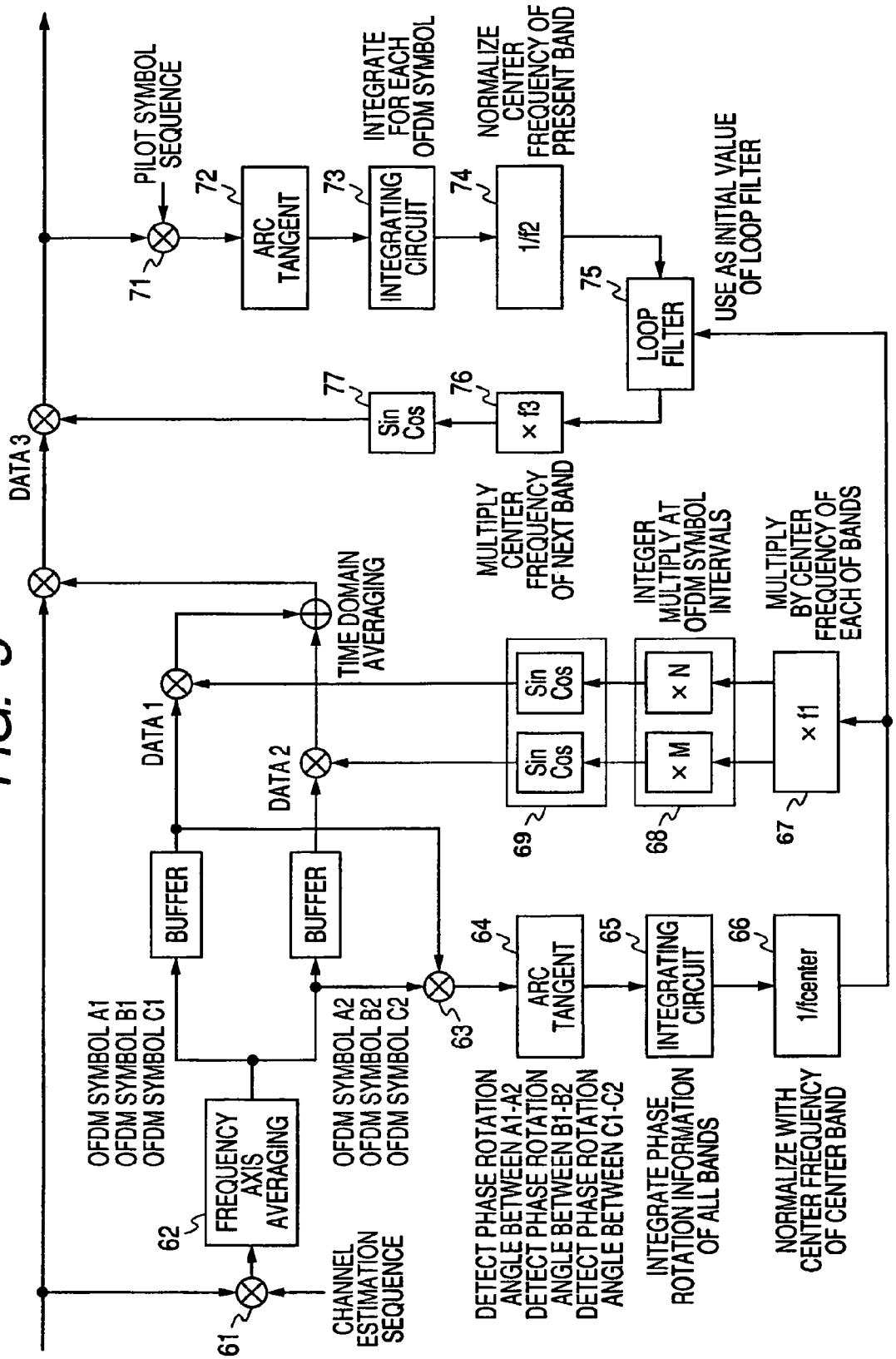
FIG. 5 is a diagram showing construction examples of the channel correcting section 6 and frequency tracking section 7 where the frequency error detected with high precision by averaging frequency errors of all bands A to C as the initial value of a loop filter for frequency tracking.

FIG. 5 shows construction examples of the channel correcting section 6 and frequency tracking section 7 in this case.

The construction and operations of the channel correcting section 6 are the same as those shown in FIG. 2, and the simple description thereon will be given herein.

The channel correcting section 6 averages phase rotation information by adding the phase rotation angles obtained between A1 and A2, B1 and B2 and C1 and C2 of bands A to C, which allows the detection of the frequency errors with high precision. Then, the averaged phase rotation information is normalized by the center frequencies $f_{center\_A}$, $f_{center\_B}$ and $f_{center\_C}$ of the bands, and they are input to the frequency tracking section 7 as the initial value of a loop filter.

The frequency tracking section 7 extracts a pilot sub-carrier in a data sub-carrier and multiplies it by a known pilot sequence by a multiplying section 71.

A phase rotation angle detecting section 72 obtains Arctangent from the multiplication result and thus obtains the phase rotation angle of the pilot symbol. An integrating section 73 integrates it for each OFDM symbol, and a normalizing section 74 normalizes it with the center frequency of the current band.

A loop filter 75 performs smoothing processing by using the detection result of the frequency error input from the channel correcting section 6 as the initial value.

Then, the result is multiplied by the center frequency of the next band in frequency hopping in multiplier section 76 and is converted in conversion section 77 to sin and cos information, which is then multiplied by the subsequent data sub-carrier.

Figure 6:
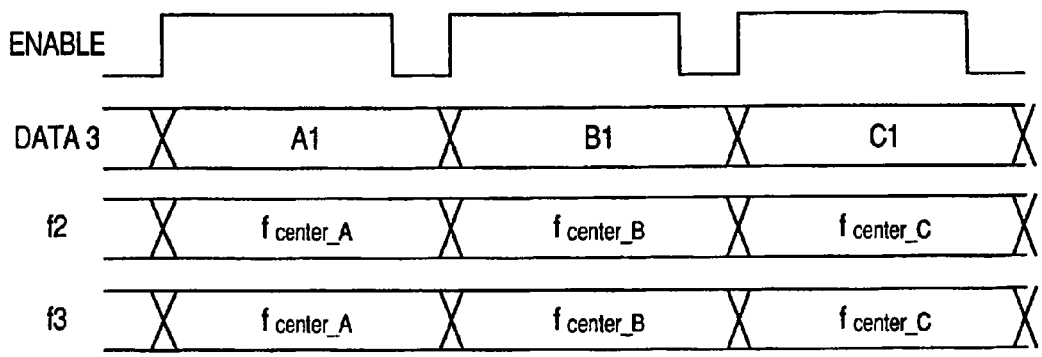
FIG. 6 is an operational timing chart in performing frequency tracking on OFDM signals subject to frequency hopping in the pattern shown in FIG. 11 within the frequency tracking section 7 shown in FIG. 5.
Figure 7:
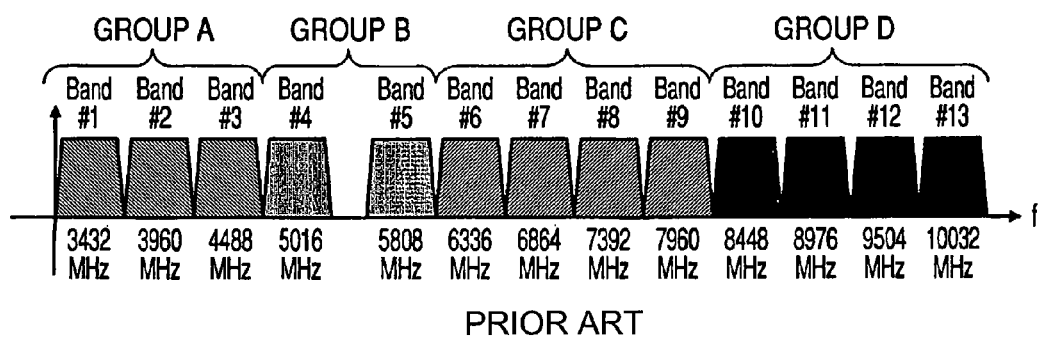
FIG. 7 is a diagram showing an example of frequency assignment defined in multi-band OFDM_UWB communication scheme (called "MB-OFDM")
Figure 8:
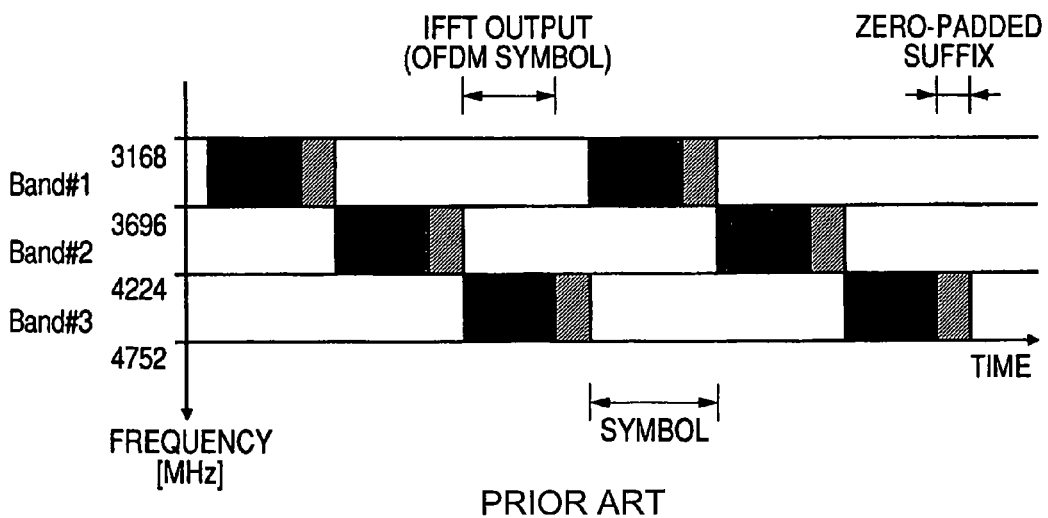
FIG. 8 is a diagram showing a state that data transmission is performed by performing frequency hopping on OFDM symbols in a time domain in multi-band OFDM scheme at the same time.
Figure 9:
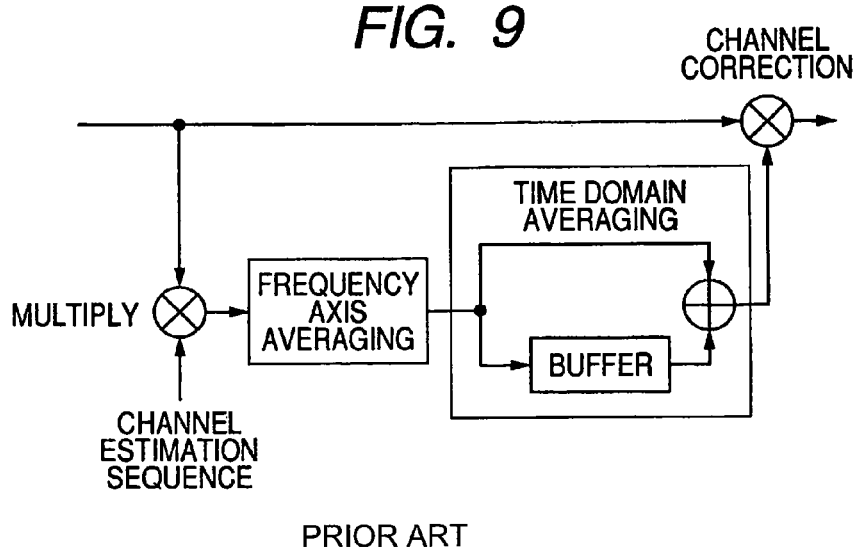
FIG. 9 is a diagram schematically showing mechanisms of the channel estimation and channel correction in OFDM transmission scheme.
Figure 10:
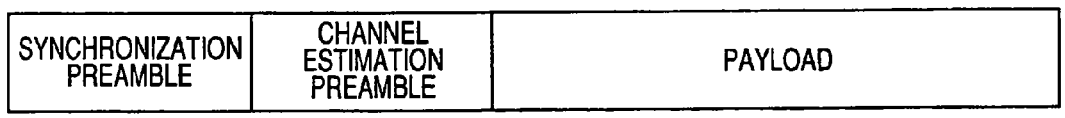
FIG. 10 is a diagram showing a packet construction example in which a synchronization sequence and channel estimation sequence are added as preambles before a payload.

FIG. 6 shows an operational timing chart in performing the frequency tracking on an OFDM signal subject to frequency hopping in the pattern shown in FIG. 11 in the frequency tracking section 7 shown in FIG. 5.

Having described the invention in detail with reference to specific embodiments, it is self-obvious that those skilled in the art can modify or alter the embodiments without departing from the scope and spirit of the invention. In other words, the invention is disclosed for the illustration purpose, and the description of this specification should not be interpreted limitedly. The substance of the invention should be determined by considering the appended claims.

What is claimed is:

1. A receiving apparatus that receives an Orthogonal Frequency Division Multiplexing (OFDM) signal, including an OFDM symbol, subject to frequency hopping on multiple bands, the OFDM symbol, which functions as a channel estimation sequence, being transmitted multiple times at hopping intervals in a time division manner on each of the bands, the apparatus comprising:

receiving means for receiving the OFDM signal transmitted on a channel;

Fourier transform means for transforming the OFDM signal into signals of sub-carriers;

channel correcting means for estimating a channel characteristic by using the OFDM symbol functioning as a channel estimation sequence resulting from the transforming into sub-carrier signals and performing channel correction thereon; and decoding means for performing symbol identification and decoding on the channel-corrected data signal back to the original data signal, wherein the channel correcting means:

obtains, for each of the bands, a frequency error between the OFDM symbols for channel estimation, which are transmitted at hopping intervals, adds and averages the frequency errors obtained for the bands and normalizes the result by the center frequencies of the bands;

on each of the bands, multiplies the normalized frequency error by each of the sub-carriers of the OFDM symbol back to the angle of phase rotation of each of the sub-carriers, integer-multiplies the phase rotation information of each of the sub-carriers by the symbol difference between OFDM symbols transmitted at hopping intervals, corrects the amount of phase rotation with respect to the channel estimation values of the OFDM symbols based on the integer-multiplied phase rotation information, which results in the agreement of the phases of the channel estimation values from the OFDM symbols on one band; and averages, thereafter, the channel estimation values of the OFDM symbols on the bands in a time domain.

2. The receiving apparatus according to claim 1, wherein the frequency error resulting from the addition and averaging the phase rotation information obtained on the bands and the normalization of the result by the center frequencies of the bands is used as an initial value of a loop filter for frequency tracking.

3. A receiving apparatus that receives an OFDM signal, including an OFDM symbol, subject to frequency hopping on multiple bands, the OFDM symbol, which functions as a channel estimation sequence, being transmitted multiple times at hopping intervals in a time division manner on each of the bands, the apparatus comprising:

a receiving section that receives the OFDM signal transmitted on a channel;

a Fourier transform section that demultiplexes the OFDM signal into signals of sub-carriers;

a channel correcting section that estimates a channel characteristic by using the OFDM symbol functioning as a channel estimation sequence resulting from the demultiplexing into sub-carrier signals and performs channel correction thereon; and a decoding section that performs symbol identification and decoding on the channel-corrected data signal back to the original data signal, wherein the channel correcting section:

obtains, for each of the bands, a frequency error between the OFDM symbols for channel estimation, which are transmitted at hopping intervals, adds and averages the frequency errors obtained for the bands and normalizes the result by the center frequencies of the bands;

on each of the bands, multiplies the normalized frequency error by each of the sub-carriers of the OFDM symbol back to the angle of phase rotation of each of the sub-carriers, integer-multiplies the phase rotation information of each of the sub-carriers by the symbol difference between OFDM symbols transmitted at hopping intervals, corrects the amount of phase rotation with respect to the channel estimation values of the OFDM symbols based on the integer-multiplied phase rotation information, which results in the agreement of the phases of the channel estimation values from the OFDM symbols on one band; and averages, thereafter, the channel estimation values of the OFDM symbols on the bands in a time domain.

4. A channel estimating apparatus that estimates the characteristics of channels through which OFDM symbols subject to frequency hopping on multiple bands are transmitted, the OFDM symbol, which functions as a channel estimation sequence, being transmitted multiple times at hopping intervals in a time division manner on each of the bands, the apparatus comprising:

channel estimation value calculating means for obtaining a channel estimation value by demultiplexing an OFDM signal into multiple sub-carriers in a frequency domain by Fourier transform and then multiplying a channel estimation sequence included as a preamble of a packet by a known sequence;

frequency error detecting means for obtaining a frequency error between OFDM symbols for channel estimation, which are transmitted at hopping intervals for each of the bands;

phase rotation information averaging means for adding and averaging frequency errors obtained for the bands;

phase rotation information normalizing means for normalizing the averaged frequency error with the center frequencies of the bands;

phase rotation angle calculating means for multiplying the normalized frequency error by each of the sub-carriers of the OFDM symbol back to the phase rotation angle of each of the sub-carriers;

channel estimation value phase correcting means for integer-multiplying the phase rotation information of each of the sub-carriers by the symbol difference between OFDM symbols transmitted at hopping intervals, and correcting the amount of phase rotation with respect to the channel estimation values of the OFDM symbols based on the integer-multiplied phase rotation information, which results in the agreement of the phases of the channel estimation values; and time-axis averaging means for averaging the phase-corrected channel estimation values on the bands in a time domain.

5. A channel estimating apparatus that estimates the characteristics of channels through which OFDM symbols subject to frequency hopping on multiple bands are transmitted, the OFDM symbol, which functions as a channel estimation sequence, being transmitted multiple times at hopping intervals in a time division manner on each of the bands, the apparatus comprising:

a channel estimation value calculating section that obtains a channel estimation value by demultiplexing an OFDM signal into multiple sub-carriers in a frequency domain by Fourier transform and then multiplies a channel estimation sequence included as a preamble of a packet by a known sequence;

a frequency error detecting section that obtains a frequency error between OFDM symbols for channel estimation, which are transmitted at hopping intervals for each of the bands;

a phase rotation information averaging section that adds and averages frequency errors obtained for the bands;

a phase rotation information normalizing section that normalizes the averaged frequency error with the center frequencies of the bands;

a phase rotation angle calculating section that multiplies the normalized frequency error by each of the sub-carriers of the OFDM symbol back to the phase rotation angle of each of the sub-carriers;

a channel estimation value phase correcting section that integer-multiplies the phase rotation information of each of the sub-carriers by the symbol difference between OFDM symbols transmitted at hopping intervals, and corrects the amount of phase rotation with respect to the channel estimation values of the OFDM symbols based on the integer-multiplied phase rotation information, which results in the agreement of the phases of the channel estimation values; and a time-domain averaging section that averages the phase-corrected channel estimation values on the bands in a time domain.

* * * * *